United States Patent [19]

Tuman

[11] 4,393,996

[45] Jul. 19, 1983

[54] AIRCRAFT ARRESTMENT SYSTEM

[76] Inventor: Cazimir Tuman, 71 Caleta Dr., Camarillo, Calif. 93010

[21] Appl. No.: 348,739

[22] Filed: Feb. 16, 1982

Related U.S. Application Data

[63] Continuation-in-part of Ser. No. 170,692, Jul. 21, 1980, abandoned.

[51] Int. Cl.³ ............................................. B64F 1/02
[52] U.S. Cl. ............................................. 244/110 C
[58] Field of Search ........... 244/110 R, 110 C, 110 F, 244/110 E, 110 G; 49/9; 256/13.1

[56] References Cited

U.S. PATENT DOCUMENTS

| | | | |
|---|---|---|---|
| 2,919,871 | 1/1960 | Sorensen | 244/110 C |
| 3,114,522 | 12/1963 | Mortimer | 244/110 C |
| 3,717,326 | 2/1973 | Leach et al. | 256/13.1 |
| 3,876,170 | 4/1975 | Whittingham | 244/110 C |

FOREIGN PATENT DOCUMENTS

| | | | |
|---|---|---|---|
| 807033 | 2/1969 | Canada | 244/110 F |
| 1081537 | 8/1967 | United Kingdom | 244/110 C |

Primary Examiner—Galen L. Barefoot

[57] ABSTRACT

A system is provided to alleviate high initial tensile load in a cable subjected to sudden impact such as airplane arrestment during landing on an aircraft carrier. A series of pulleys or other supporting structure is arranged to impart a curved shape to a cable stretched thereacross. One or more of the pulleys are spaced along opposing sides of the cable impact point so that one side is a mirror image of the other. The pulleys are positioned to change the cable angular direction by an amount less than that which would cause a total reflection of the transverse wave formed in the cable on impact. In this manner, the wave is partially reflected at each pulley/cable contact point. This action generates a corresponding number of small tensile load increases and spreads them out over a relatively long time period thereby alleviating the initial aircraft impact force.

12 Claims, 3 Drawing Figures

AIRCRAFT ARRESTMENT SYSTEM

This application is continuation-in-part of U.S. Application Ser. No. 170,692, filed July 21, 1980, now abandoned.

BACKGROUND OF THE INVENTION

1. Field of the Invention

The present invention relates to systems for arresting movement of large bodies and, more particularly, to a method and apparatus for alleviating the initial high impact force of a moving vehicle or aircraft against a capturing means.

2. Description of the Prior Art

External devices for stopping the high velocity movement of large bodies within a short distance are generally described with reference to aircraft landing arrestment devices. U.S. Pat. No. 3,876,170 describes the use of a complicated net arrangement deployed across the landing path of an aircraft. Major and minor groupings of Nylon nets are slung between stanchions on opposing sides of the landing area. The ends of the nets are connected to known energy absorption mechanisms such as hydraulic arrestor gears. The nets successively break-away from the stanchions as an incoming plane engages the various groupings. The plane is finally halted with the energy absorption apparatus.

Other patents like Canadian Pat. No. 807,033 and Belgium Pat. No. 657,843 are concerned with improvements on the energy absorption apparatus per se. Such apparatus are connected to the ends of a strap or cable which is stretched across a landing strip. As the aircraft lands, a hook engages the strap or cable to bring the craft to a halt.

The Canadian patent particularly describes an elongated prismatic box that inhibits tangling of the strap at the entrance of the energy absorption apparatus. The Belgium patent concerns a multiple hydraulic piston arrangement connected to the cable ends through flared tubes for absorbing the inertial energy of a landing aircraft.

In those systems utilizing taut cables or the like for engagement with a hook mechanism, pronounced transverse waves are propagated along the cable span. These waves radiate outward from the hook impact point. They continue until interrupted by some external means associated with the cable. When interrupted, the wave is reflected back toward the aircraft hook. At the same time the wave is reflected back, another tensile-load increase is generated in the cable at the point of reflection. The many tensile-load increases generated each time a wave is reflected back along the cable span accumulate rapidly and would cause the cable to fail if the tensile-load increases were not absorbed by the energy absorption devices.

British Pat. No. 1,081,537 has recognized the desirability of dampening the initial transverse wave to alleviate rapid tensile-load increases. The patentees attach a second cable to the main cable for attachment of various types of dampening means. These include heavy weights, springs and a hydraulic brake. Alternatively, the main cable is split into two cables with each terminating in a braking device. In such case, four braking devices are required for the overall system.

It is clear that the system described in the British patent is cumbersome and requires a great deal of space and equipment. Further, the amount of transverse wave reflection would be very difficult to regulate due to all the variables implicit in the different dampening techniques.

SUMMARY OF THE INVENTION

The present invention provides an uncomplicated and inexpensive method and apparatus for alleviating failure in linear constraining means used to arrest inertial movement of large bodies. The invention is static in nature and is not based on wave dampening by mechanical wave absorption as taught in the aforementioned British patent.

The invention utilizes a constraining means at least a portion of which includes a flexible linear element that is capable of transmitting waves. Guide means are positioned against the linear portion in a manner to change the angular direction thereof by an amount less than that which would cause a total reflection of the transverse wave formed upon impact of the moving body. In this manner, control over the timing and magnitude of cable tensile-load increases are achieved and the initial impact shock of arresting large body movement can be moderated.

DESCRIPTION OF THE PREFERRED EMBODIMENTS

Figure 1:
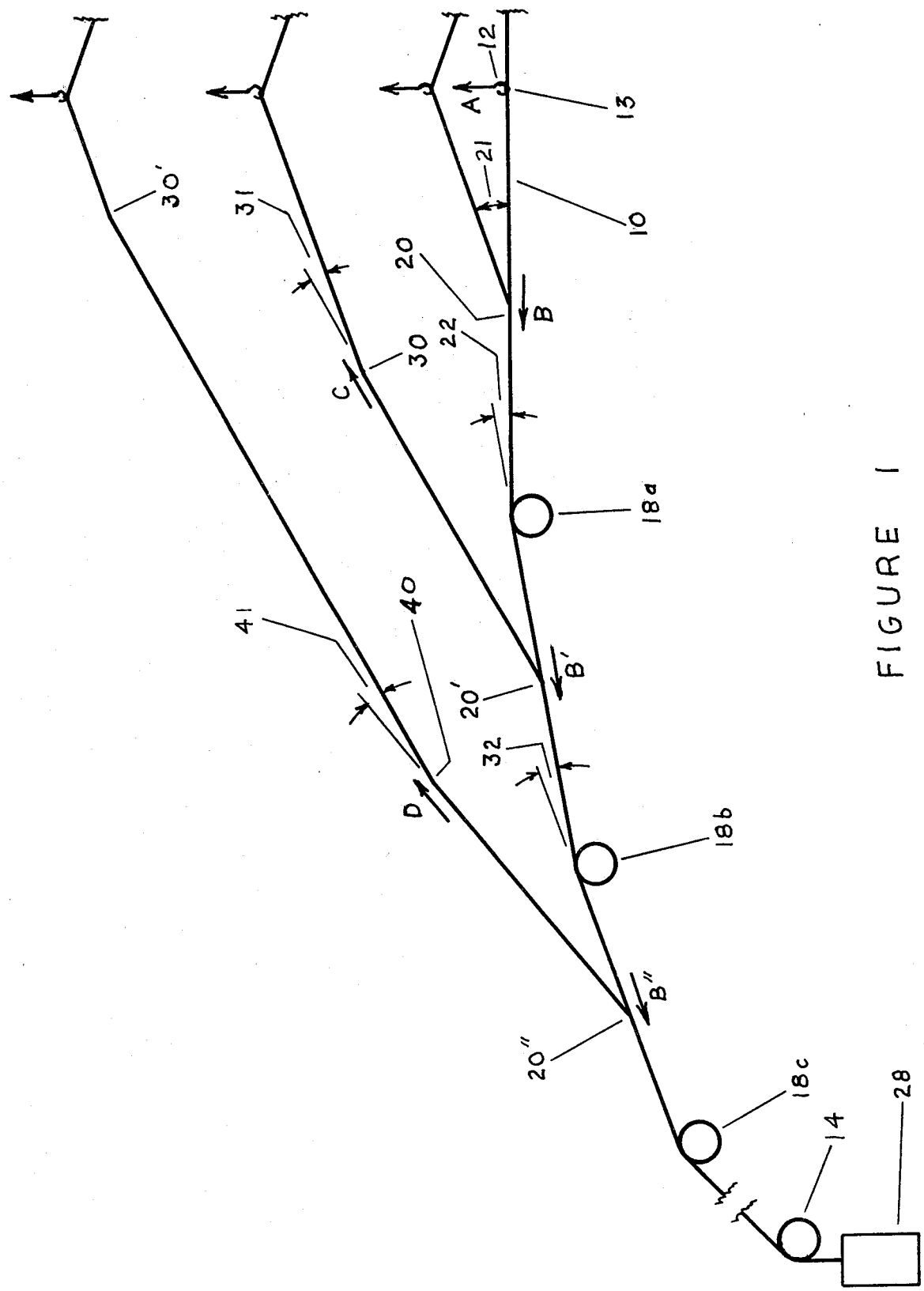
FIG. 1 is a schematic plan view of the invention showing transverse wave propagation along a portion of a cable drawn across a moving body arrestment area at different times after impact.

The improved arrestment system of the present invention will now be described with reference to FIG. 1. For ease of description, only one side of the arrestment system is shown. The side not shown may be considered as a mirror image thereof.

A basic part of the invention is the constraining means shown by reference numeral 10. Such means must include a linear flexible portion that is capable of transmitting transverse waves. For example, it could include various types of moving body capturing devices connected to the linear flexible elements extending outwardly therefrom in opposing directions. Most simply, the constraining means may be entirely linear such as a wire, rope, strap or cable.

The linear element 10, such as a cable, is pulled taut across an arrestment area. In the case of aircraft, this would be a landing strip. Here a landing plane will project a hook mechanism depicted by reference numeral 12 for engagement with the cable at point 13. Preferably, the engagement point will be at the cable midpoint which is commonly located proximate the arrestment area midpoint.

Opposing ends of the cable extend over optional primary guide members 14 into energy absorbing apparatus 28. Such apparatus are well known in the art, as noted hereinabove, and provide the basic arrestment of the moving body inertial force as depicted by arrow A.

Linear element guide means provide an essential feature of the present invention. They comprise support members 18a,b,c spaced along predetermined points of the cable span. They are bearing members against which the cable or other elements are drawn. The members may comprise any one or combination of pulleys, sheaves, pins, beams, spindles, rolls, posts, shafts or other stationary structure that provide one or more points of contact with cable 10.

Although three points of contact are shown in FIG. 1 excluding primary guides 14, one, two, four or more can be used. The support members particularly orient opposing cable portions into the desired curved shape along the same plane as the transverse waves which are propagated. They should permit longitudinal movement of the cable and allow transverse wave flow where appropriate.

Preferably, support members 18a,b,c are pulleys mounted at fixed points directly on the arrestment area or on an underlying structure which is secured at a fixed position in the arrestment area. The pulleys are located on the side of the cable thickness opposite the direction of impact force shown by arrow A.

Pulley 18a and its mirror-image counterpart (not shown) are spaced apart a distance along the cable length sufficient to allow safe and reasonable passage of the moving body through the center of the arrestment area. Both pulleys are aligned so that cable 10, when stretched across the pulleys, will be perpendicular to the arrestment area longitudinal centerline and, presumably, the path of the moving body.

From pulley 18a, a succession of pulleys may be used to impart a curved shape to the cable. The curve will be concave when viewed from the impact side of the cable. Preferably, the curve is shaped to have a diminishing radius of curvature. Each outwardly successive pulley is positioned behind the previous one to create an angular change in the cable direction. In this manner the amount or magnitude of transverse wave reflection can be controlled. Similarly, the cable distance between pulleys 18a,b,c and successive pulleys, controls the timing of cable tensile-load increases. Transverse wave reflection will also be affected by the physical characteristics of the cable and other devices connected thereto and the impact velocity.

Figure 2:
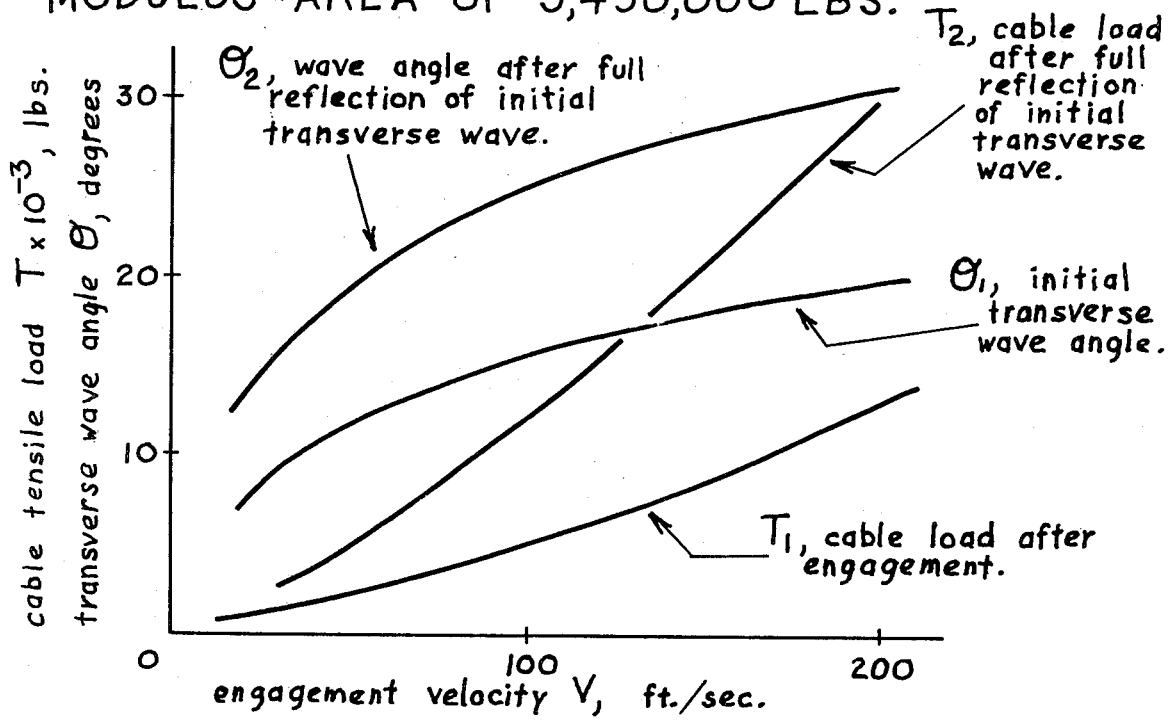
FIG. 2 is a graph showing cable angle for full reflection of the transverse wave at increasing impact velocities and the tensile load on impact and at full reflection.

FIG. 2 sets forth the relationship of a particular cable with tensile load, transverse wave angle and cable impact velocity. In general, the sum of cable angles between successive pulleys should not exceed about 30°. For the FIG. 2 example, the maximum angle is shown in the upper portion as $\theta_2$.

Referring back to FIG. 1, pulley 18b is shown horizontally offset behind pulley 18a so that cable 10 is deflected by an amount equal to angle 22. Likewise, pulley 18c is positioned behind pulley 18b to create another cable angular deflection shown by angle 32. As mentioned, additional pulleys may be utilized until the cumulative sum total of angular deflections proximates the angle required for total reflection or, primary guide member 14 directing the cable toward the energy absorber 28 causes total reflection.

OPERATION OF THE SYSTEM

Arrestment of a moving body, such as an aircraft, occurs when hook 12 engages cable 10 as the craft enters the arrestment area. An initial tensile-load increase in the cable will be propagated rapidly past the series of pulleys 18a,b,c towards guide member 14. The initial transverse wave shown by kink 20 in the cable span, will be propagated less rapidly towards the pulleys in the direction shown by arrow B. When this transverse wave reaches pulley 18a, it will be partially reflected as wave kink 30 back towards hook engagement point 13 in the direction shown by arrow C. Wave kink 30 will form angle 31 in the cable as it moves back towards the hook. At the same moment, a second tensile-load increase will be generated in the cable at pulley 18a whose magnitude will be somewhat proportional to the cable angular deflection 22. Thus, the magnitude of the second tensile-load increase can be controlled by appropriately setting the amount of cable angular deflection at the first pulley 18a.

To continue, the transverse wave kink 20 will pull the cable away from, and free of, pulley 18a as it is propagated further toward pulley 18b as wave kink 20' in the direction of arrow B'. The cable will still be in contact with the pulley 18b because the portion of the cable from kink 20' back to the absorber 28 acquires only a longitudinal cable velocity which keeps the cable in contact with all but pulley 18a.

When the transverse wave kink 20' moves to pulley 18b, it will again be partially reflected as kink 40 and move at angle 41 in direction D toward hook contact point 13. At the same time, a third tensile-load increase will be generated whose magnitude will be somewhat proportional to the amount of cable angular deflection shown by angle 32. During the same time interval, wave kink 30 will have moved further toward point 13 as depicted by numeral 30'.

From the above, it will be appreciated that the time when the third tensile-load is to occur can be controlled by regulating the cable distance between the first and second pulleys 18a and 18b. Further, the magnitude of the third tensile-load increase can be controlled by regulating the amount of cable angular deflection 32 at pulley 18b.

As before, the wave kink 20' will pull the cable away from pulley 18b and will be propagated further toward pulley 18c as wave kink 20" in the direction of arrow B". At this point another partial reflection of the wave will occur. If the wave succeeds in pulling the cable away from, and free of, pulley 18c or the last pulley of the series of pulleys, then it will continue along the cable and be fully reflected at the primary guide member 14. Arrestment will then continue to completion in accordance with the particular operation of the energy absorption apparatus 28. If the transverse wave does not succeed in pulling the cable away from any one of the series of pulleys, then that one pulley operates to fully reflect the wave and any remaining pulleys are superfluous.

It will be understood that there are practical limits to the sum of the cable distances between adjacent pulleys and to the sum of the cable angular deflections imposed by the series of pulleys. The cable distances between adjacent pulleys are limited by the space available in the cable span. This, in turn, limits the sum of the time increments between cable tensile-load increases that result when an initial transverse wave moves past the series of pulleys.

Figure 3:
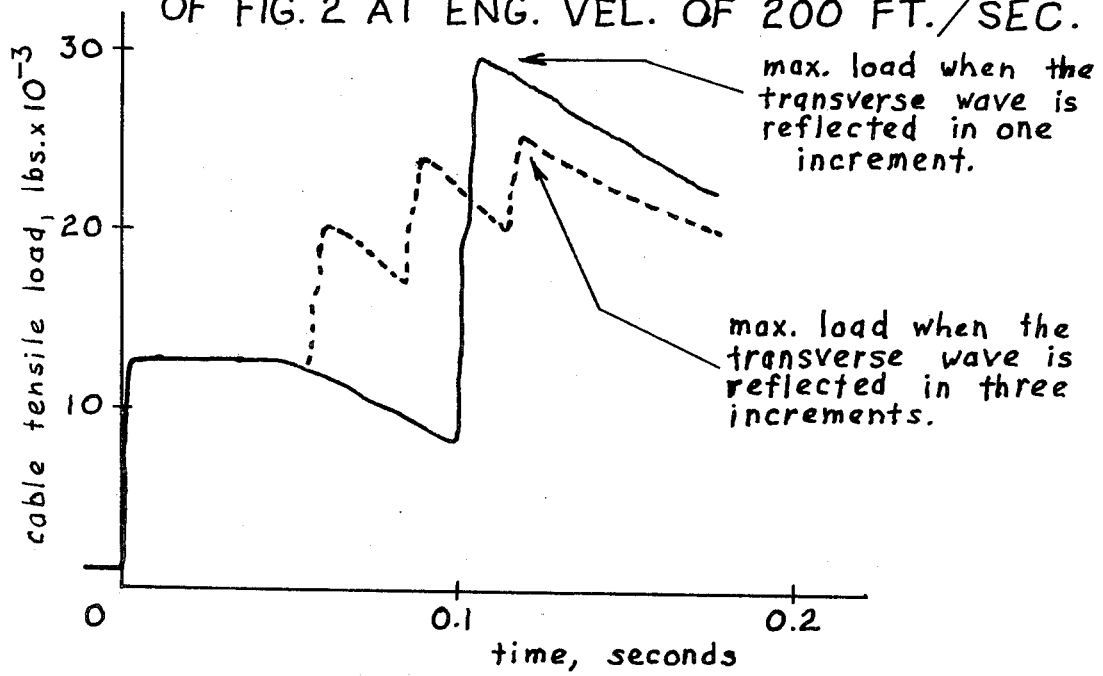
FIG. 3 is a graph showing cable load versus time after impact for a conventional cable span with full reflection and, a cable span shaped to cause three partial reflections of the transverse wave.

The sum of the cable angular changes at each pulley is limited to an angle about equal to the gross transverse wave angle of a fully reflected initial transverse wave. Also, the sum of the cable tensile-load increases that result when an initial transverse wave is partially reflected at each pulley, is less than the cable tensile-load increase of the fully reflected initial transverse wave. Note FIG. 3 which illustrates the maximum tensile-load for three partial reflections compared to the load resulting from a full reflection.

With the above criteria in mind, a large variation of tensile-load increases at different times can be achieved by regulating the amounts of cable angular change each pulley is to provide and by arranging the cable distances between the pulleys appropriately. Such a system provides a simple, readily controllable and effective way to moderate cable loads in a manner not heretofore discovered.

While the invention has been described with respect to preferred embodiments, it will be apparent to those skilled in the art that various modifications may be made without departing from the scope and spirit of the invention. Accordingly, it is to be understood that the invention is not to be limited by the specific embodiments described, but only by the scope of the appended claims.

I claim:

1. An arrestment system having constraining means placed across an arrestment area for engagement with a moving body, said engagement causing the formation of transverse waves in the constraining means, including tensile-load absorption means at opposing ends of the constraining means; wherein the improvement comprises:

stationary guide means positioned against opposing flexible linear portions of said constraining means at the side thereof opposite the direction of said moving body and longitudinally offset from the moving body engagement point;

said guide means imparting a curved shape having a diminishing radius of curvature to said portions whereby less than total reflection of the transverse waves occurs at the point where said guide means contact the flexible linear portions of said constraining means.

2. The system of claim 1 wherein said curved shape is concave when viewed from the engagement point side of said constraining means and said opposing portions are mirror images of each other.

3. The system of claim 2 wherein at least said portions of the constraining means comprise an elongated flexible element selected from the group consisting of wire, rope, strap and cable.

4. The system of claim 3 wherein said guide means comprise any one or combination of support members selected from the group consisting of pulleys, sheaves, pins, curved beams, spindles, rolls, posts and shafts.

5. The system of claim 4 wherein said guide means comprise at least two support members positioned relative to each other to cause a change in the angular direction of the flexible element by an amount less than about 30°.

6. The system of claim 4 wherein said flexible element comprises a cable and said support members comprise pulleys.

7. The system of claim 5 wherein one or more of the support members are mounted upon an underlying structure.

8. The system of claim 5 including a primary guide member located adjacent each opposing end of the flexible element to direct said element to the tensile-load absorption means.

9. A method for controlling the magnitude and timing of tensile-load increases in a flexible linear element anchored at both ends which is impacted by a moving body causing the propagation of longitudinal tensile loads and transverse waves comprising:

shaping the element into two mirror image curved portions each located about equidistant from the point of impact by drawing the element against stationary support members;

providing said element with longitudinal freedom of movement and transverse freedom of movement in the direction of impact; and, allowing passage of the longitudinal tensile loads while partially reflecting the transverse waves formed at impact with each support member.

10. The method of claim 9 including the step of absorbing the tensile load at both ends of said element.

11. A method of stopping an aircraft landing on a runway comprising:

A. placing apart a first pair of stationary cable support members on the runway with each member being equidistant from opposing sides of the aircraft landing path in a plane perpendicular thereto, the distance between each member sufficient to allow safe and effective passage of the aircraft;

B. placing apart a second pair of stationary cable support members on the runway with each member being equidistant from opposing sides of the aircraft landing path in a plane perpendicular thereto, the distance between each member of said second pair being greater than the distance between said first pair of support members with the second pair being horizontally offset from said first pair in a direction opposite to the direction of aircraft movement;

C. locating each member of the second pair from the adjacent respective member of the first pair to allow partial reflection of a transverse wave moving along a cable positioned thereagainst;

D. drawing a cable taut against each of the support members on the side thereof toward the direction of aircraft movement;

E. attaching each end of the cable to a fixed energy absorbing device located on opposing sides of the runway;

F. engaging the cable with engagement means from the aircraft as it lands on the runway causing the propagation of transverse waves in the cable;

G. partially reflecting the transverse waves at each support member to moderate the initial cable tensile-load increase; and, H. absorbing the moderated tensile-load with the energy absorbing device and stopping movement of the aircraft.

12. The method of claim 11 wherein after step B., include the step of orienting the support members on one side of the aircraft landing path to be a mirror image of the other side.

* * * * *